(12) United States Patent
Halemba et al.

(10) Patent No.: US 12,220,846 B2
(45) Date of Patent: Feb. 11, 2025

(54) MOLDING ASSEMBLY

(71) Applicant: HUSQVARNA AB, Huskvarna (SE)

(72) Inventors: Joachim Halemba, Gerstetten (DE); Roland Hausner, Nersingen (DE); Wolfgang Kley, Laupheim (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/717,634

(22) PCT Filed: Jun. 29, 2022

(86) PCT No.: PCT/EP2022/067861
§ 371 (c)(1),
(2) Date: Jun. 7, 2024

(87) PCT Pub. No.: WO2023/104355
PCT Pub. Date: Jun. 15, 2023

(65) Prior Publication Data
US 2024/0416559 A1    Dec. 19, 2024

(30) Foreign Application Priority Data

Dec. 7, 2021    (WO) .................. PCT/EP2021/084475

(51) Int. Cl.
*B29C 39/02*    (2006.01)
*B22D 29/00*    (2006.01)
(Continued)

(52) U.S. Cl.
CPC ............ *B29C 39/36* (2013.01); *B22D 29/001* (2013.01); *B29C 33/0022* (2013.01);
(Continued)

(58) Field of Classification Search
CPC ... B29C 33/0022; B29C 33/442; B29C 39/02; B29C 39/028; B29C 39/36;
(Continued)

(56) References Cited

U.S. PATENT DOCUMENTS 4,109,821 A    8/1978    Lutz

FOREIGN PATENT DOCUMENTS

DE    3046826 C1    4/1982
DE    3908479 A1    9/1989
(Continued)

OTHER PUBLICATIONS

International Search Report and Written Opinion of corresponding International Application No. PCT/EP2022/067861 mailed Oct. 24, 2022, all pages cited in its entirety.
(Continued)

*Primary Examiner* — Leo B Tentoni
(74) *Attorney, Agent, or Firm* — Burr & Forman LLP (57) ABSTRACT

A method of manufacturing a component (124) having a main body (116) and at least one ring sleeve (118) through a molding assembly (100), the method comprising: providing a mold (102) having an inlet (115) and defining a hollow portion (H); placing at least one core to form a free-space (104, 106) within the component (124) inside the mold (102) to bifurcate the hollow portion (H) into a first cavity and a second cavity; pouring a molding material (117) inside the mold (102) through the inlet (115); allowing the molding material (117) to set inside the mold (102) around the core within the first cavity and the second cavity to form a main body (116) and at least one ring sleeve (118) of the component (124); connecting the first cavity and the second cavity and forming at least one first bond and one second bond (130, 132, 134, 136) between the main body (116) and the at least one ring sleeve (118); and removing the at least one core from at least part of the hollow portion (H) within the mold (102); characterized in that: providing the core with at least one recess allowing the molding material (117) to flow therethrough such that on withdrawing the core out of the mold (102), at least one first bond (130, 132) breaks
(Continued)

and on withdrawing the core outside the mold (102), at least one second bond (134, 136) breaks.

10 Claims, 4 Drawing Sheets

(51) Int. Cl.
    *B29C 33/00*     (2006.01)
    *B29C 33/44*     (2006.01)
    *B29C 39/26*     (2006.01)
    *B29C 39/36*     (2006.01)
    *B29C 45/00*     (2006.01)
    *B29C 45/40*     (2006.01)
    *B29C 45/26*     (2006.01)

(52) U.S. Cl.
    CPC .......... *B29C 33/442* (2013.01); *B29C 39/028* (2013.01); *B29C 39/26* (2013.01); *B29C 45/006* (2013.01); *B29C 45/0062* (2013.01); *B29C 2045/2683* (2013.01); *B29K 2905/12* (2013.01); *B29K 2909/00* (2013.01)

(58) Field of Classification Search
    CPC .............. B29C 45/006; B29C 45/0062; B29C 2045/2683; B29C 45/40
    USPC .............................................. 264/328.8, 334
    See application file for complete search history.

(56) References Cited

FOREIGN PATENT DOCUMENTS

| | | |
|---|---|---|
| EP | 3230643 A1 | 10/2017 |
| FR | 2644223 B1 | 8/1991 |
| FR | 2922475 B1 | 8/2013 |
| JP | 2002340273 A | 11/2002 |
| KR | 950014651 A | 6/1995 |
| WO | 2016091297 A1 | 6/2016 |
| WO | 2020211961 A1 | 10/2020 |

OTHER PUBLICATIONS

International Preliminary Report on Patentability for corresponding International Application No. PCT/EP2022/067861 mailed Dec. 5, 2023, all pages cited in its entirety.

MOLDING ASSEMBLY

TECHNICAL FIELD

The present disclosure relates to a component, in particular a connecting element and a method of manufacturing a component. More specifically, the present disclosure relates to the molding assembly which improves simultaneous casting of multiple individual parts of a component.

BACKGROUND

Molding assembly is generally used to solidify molding material (say metal, plastic, polymer, glass) into desired shapes. Generally, the molding assembly has integrated parts to access molding. However, there may be instances where a manufactured component having connected parts need to be isolated. Damage may occur while isolating the connected parts of the component. This is generally cumbersome since breaking or any wear which may be involved during isolating the connected parts of the component makes the experience troublesome and less satisfactory for a common user.

An example of a molded component is provided in German patent DE 3 908 479 (herein referred to as '479 reference). The '479 reference provides a molding assembly that includes a core and a pair of oppositely placed molds. The pair of oppositely placed molds define a cavity therebetween. The core is a cylindrical core element having a recess. The core is inserted into the cavity and the molding material is injected. However, the '479 reference seems to provide the opening at the front of the core. The molding material flows from one cavity to another cavity of the molding assembly via the opening and bonds are form within the opening area upon solidification (or hardening) of the molding material. However, there is no provision to break these bonds.

Another example of the molded component is provided in European patent EP 3 230 643 (hereinafter referred to as '643 reference). The '643 reference provides a connecting element for one or more flexible tubes. The element exhibits a main body and at least one ring sleeve that can in operation move relative to each other to connect or disconnect a flexible tube by clamping action. The element is made by injection molding. To allow for a cost-effective manufacturing of the element the mold allows to manufacture the main body and the ring sleeve as one part, although in operation the main body and the ring sleeve are two separate parts. This is achieved by connecting the two parts via at least one bond during the manufacturing process and requiring the user of the element to actively break this bond in front of the first operation. However, there is a psychological barrier on side of a user being forced to actively break the connection between two parts of an element.

Another example of the molded component is provided in German patent DE 3 046 826 (herein referred to as '826 reference). The '826 reference discloses about casting of a tubular body. During the casting of the tubular body, a flange is simultaneously casted. A plurality of connecting webs remain between the tubular body and the flange, which serve on one hand to feed the casting material during casting and on the other to hold the flange on the tubular body. When the tubular body is processed after the casting, the plurality of connecting webs is removed for example by grinding, so that the actual flange then lies loosely on the tubular body. However, the '826 reference seems to have provision to break the bonds by additional manufacturing process such as grinding.

Thus, there is a need for an improved molding machine which allows integrated casting of multiple parts to avoid aforementioned issues.

SUMMARY

In view of the above, it is an objective of the present invention to solve or at least reduce the drawbacks discussed above. The objective is at least partially achieved by a method of manufacturing a component through a molding assembly. The method includes providing the mold having an inlet and defining a hollow portion. The method further includes placing at least one core to form a free-space within the component inside the mold to bifurcate the hollow portion into a first cavity and a second cavity. The method further includes pouring a molding material inside the mold through the inlet. The method further includes allowing the molding material to set inside the mold around the core within the first cavity and the second cavity to form a main body and at least one ring sleeve of the component. The method is characterized in that providing the core with at least one recess allowing the molding material to flow therethrough connecting the first cavity and the second cavity forming at least one first and one second bond between the main body and the at least one ring sleeve. The method further includes removing the at least one core from at least part of the hollow portion within the mold. Thus, the present disclosure provides a simple, efficient, and user-friendly molding assembly which allows simultaneous and trouble-free manufacturing of multiple-piece components.

According to an embodiment of the present invention, forming the bonds includes forming of the main body and the at least one ring sleeve such that the bonds are, in particular fully, enclosed between the main body and the at least one ring sleeve. Thus, the bonds and resulting fracture surfaces can be hidden from a user's view by placing the bonds between main body and ring sleeve.

According to an embodiment of the present invention, placing at least one core to form a free-space within the component inside the mold comprises placing a first core to form at least one first free-space and a second core to form at least one second free-space within the component inside the mold, wherein upon withdrawing the first core out of the mold at least one first bond preferably all first bonds, break and wherein upon withdrawing the second core out of the mold at least one second bond, preferably all second bonds, break. In this way, different additional components can be formed integrally with the main body. It is also possible to produce two main bodies with respective ring sleeves in that way. Thus, a very efficient production method is provided.

According to an embodiment of the present invention, the first core is withdrawn in a direction substantially different to the direction in which the second core is withdrawn, in particular wherein the first core is withdrawn in a direction opposite to the direction in which the second core is withdrawn.

In this way, o smaller withdrawal distances for the separate cores are necessary, the risk of molding defects can be decreased.

According to an embodiment of the present invention, the at least one core comprises at least one core main body and at least one, in particular two, arm(s) attached to the core main body, thus, allowing the molding material to set inside the mold around the core main body within the first cavity and/or the second cavity to form the main body and allowing the molding material to set inside the mold around the arm(s) within a free-space to form the ring sleeve. In this way a complex geometry of the component can be realized, adapted to the separation of the main body and the ring sleeve by the withdrawal of the core.

According to an embodiment of the present invention, the at least one core comprises at least one core main body and at least one, in particular two, arm(s) separate from core main body and movable relative to the core main body, thus, allowing the molding material to set inside the mold around the core main body within the first cavity and/or the second cavity to form the main body and allowing the molding material to set inside the mold around the arm(s) within a free-space to form the ring sleeve. Such an embodiment may have advantages in cases where the geometry of the component does not provide sufficient support relative to the mold, when the core is moved. Further, such an embodiment may provide additional degrees of freedom for producing geometries, e.g. when the core main body and the arms shall be withdrawn in different, in particular non parallel, directions.

According to an embodiment of the present invention, withdrawing the core out of the mold comprises withdrawing the at least one core main body and the at least one arm simultaneously in a movement relative to the mold such that the at least one first bond and the at least second bond break, or
wherein withdrawing the core out of the mold comprises withdrawing the at least one arm at least partially out of the mold before or after withdrawing the core main body out of the mold in a movement of the at least one arm relative to the core main body such that the at least one first bond and the at least second bond break,
or
wherein withdrawing the core out of the mold comprises rotating the at least one arm relative to the mold such that the at least one first bond and the at least second bond break. Thus, breaking of the bonds can be realized in a way adapted to the geometry of the component.

According to an embodiment of the present invention, the arm(s) comprise at least one, preferably wherein each arm comprises at least one recess, allowing the molding material to set inside the recess to form the bond(s),
and/or
wherein the at least one arm is provided as a sleeve element comprising recesses in the form of openings. In this way the bonds can be produced in a very efficient way at positions where desired. According to an embodiment of the present invention, the component is a connecting element. The component may be any two-piece component such as a hose connector, quick coupler, and the like.

According to an embodiment of the present invention, the method includes forming the bonds with the component between an outer surface of the main body and an inner surface of the at least one ring sleeve. This provides improved aesthetic and functionality to the component, even after breaking of the bonds post first-use of the component.

According to an embodiment of the present invention, a component, in particular a connecting element is provided. The connecting element may be manufactured according to the claimed method. The connecting element includes a main body. The connecting element includes at least one ring sleeve. The at least one ring sleeve and the main body are rotatable relative to each other. The main body and the at least one ring sleeve are manufactured together integrally molded as one part during the manufacturing process forming at least one bond between the main body and the at least one ring sleeve. The connecting element is characterized in that the main body and the at least one ring sleeve enclose places of fracture resulting from breaking of the at least one bond. Further, the places of fracture may be generated by breaking of the bond on rotating the ring sleeve around the main body. This action may be performed before the product i.e., the connecting element is made available to the users, and thereby to avoid any unwanted and unexpected breakage during first-use of the product by the users.

According to an embodiment of the present invention, the at least one bond is formed between an outer surface of the main body and an inner surface of the at least one ring sleeve such that the places of fracture are enclosed by the main body and the at least one ring sleeve, in particular in such way that the places of fracture are not visible from outside of the component. Thus, the component can be produced in one molding process, whereas the resulting places of fracture are hidden from a user's view, giving the component an advantageous outer appearance.

According to an embodiment of the present invention, the molding material of the main body or the molding material of the at least one ring sleeve is different from the molding material of the bonds, in particular such that the molding material of the bonds breaks easier than the molding material of the main body or of the at least one ring sleeve in a solidified state of the molding material. Thus, it is possible to positively influence the breakability of the bonds. It particular, it is possible to make the main body of one specific molding material and the ring sleeve of a different specific molding material, wherein the bonds are made either of the molding material of the main body or of the molding material of the ring sleeve.

According to an embodiment of the present invention, the places of fracture result from breaking of the bonds by removing the at least one core from at least part of the hollow portion within the mold. This ensures that the places of fracture are formed from breaking of the bonds, based on removing of the at least one core, leading to efficient, and simple manufacturing of the component.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention may be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

Figure 1:
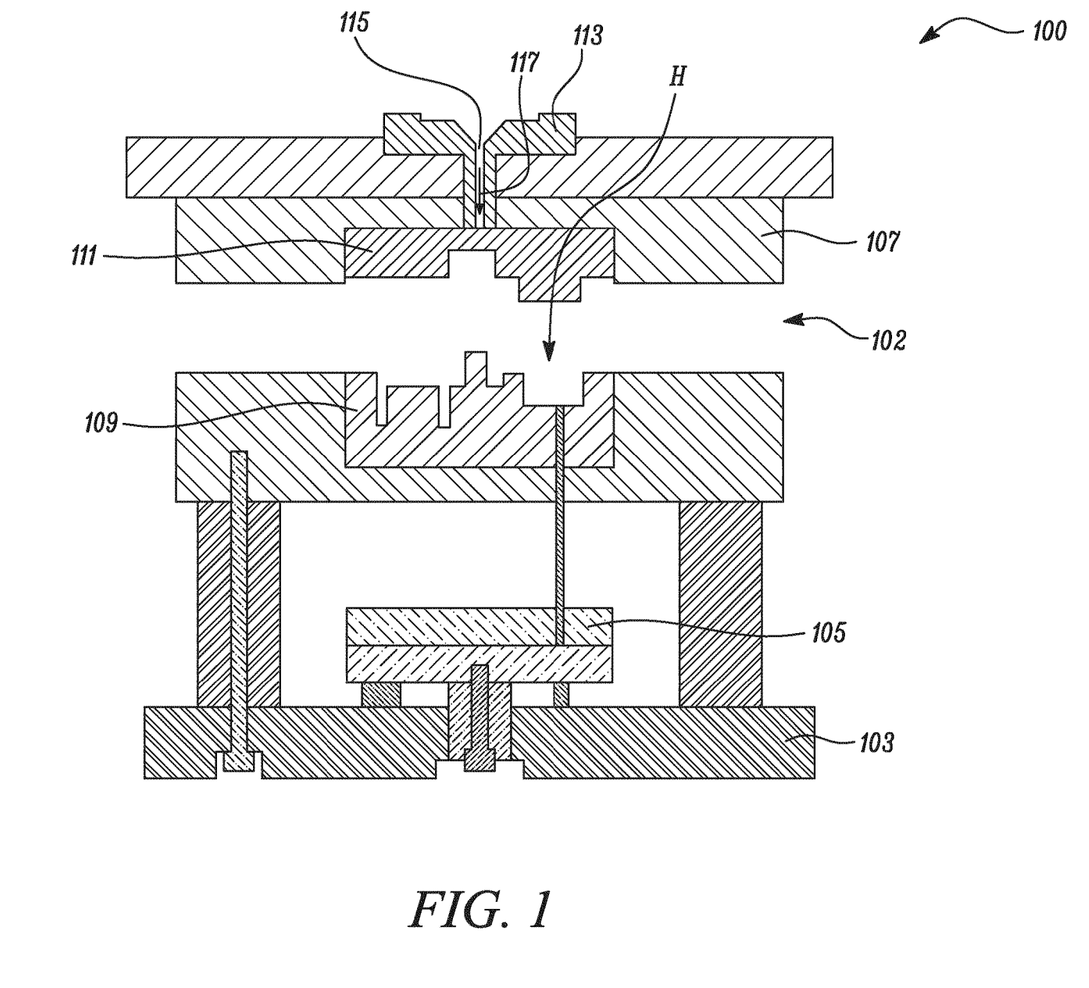
FIG. 1 shows a molding assembly, in accordance with an aspect of the present disclosure.

FIG. 1 illustrates a molding assembly 100. The molding assembly 100 includes a mold 102. The mold 102 may be a hollow portion 102. The molding assembly 100 further includes a moving side 103 and an ejector system 105, which find application during casting and ejecting of cast(s) by the molding assembly 100. The molding assembly 100 further includes a stationary side 107. Moreover, the molding assembly 100 includes a sprue and runner system 113, along with an inlet 115. The inlet 115 is adapted to allow ingress of a molding material 117 into the mold 102. Moreover, the molding assembly 100 includes a core side 109 and a cavity side 111, as illustrated here. In some embodiments, molding process may be any one of a bench molding, a floor molding, a pit molding, and a machine molding. Further, the molding process may use any mold material such as, but need not necessarily, green sand mold, dry sand mold, skin dried mold, core sand mold, loam mold, shell mold, carbon-dioxide mold, cement bonded sand mold, plaster molding, metallic molding, loam molding and the like. The mold 102 may be of any type which instantaneously, perfectly forms any component, or provide any other desired benefit or property.

Figure 2:
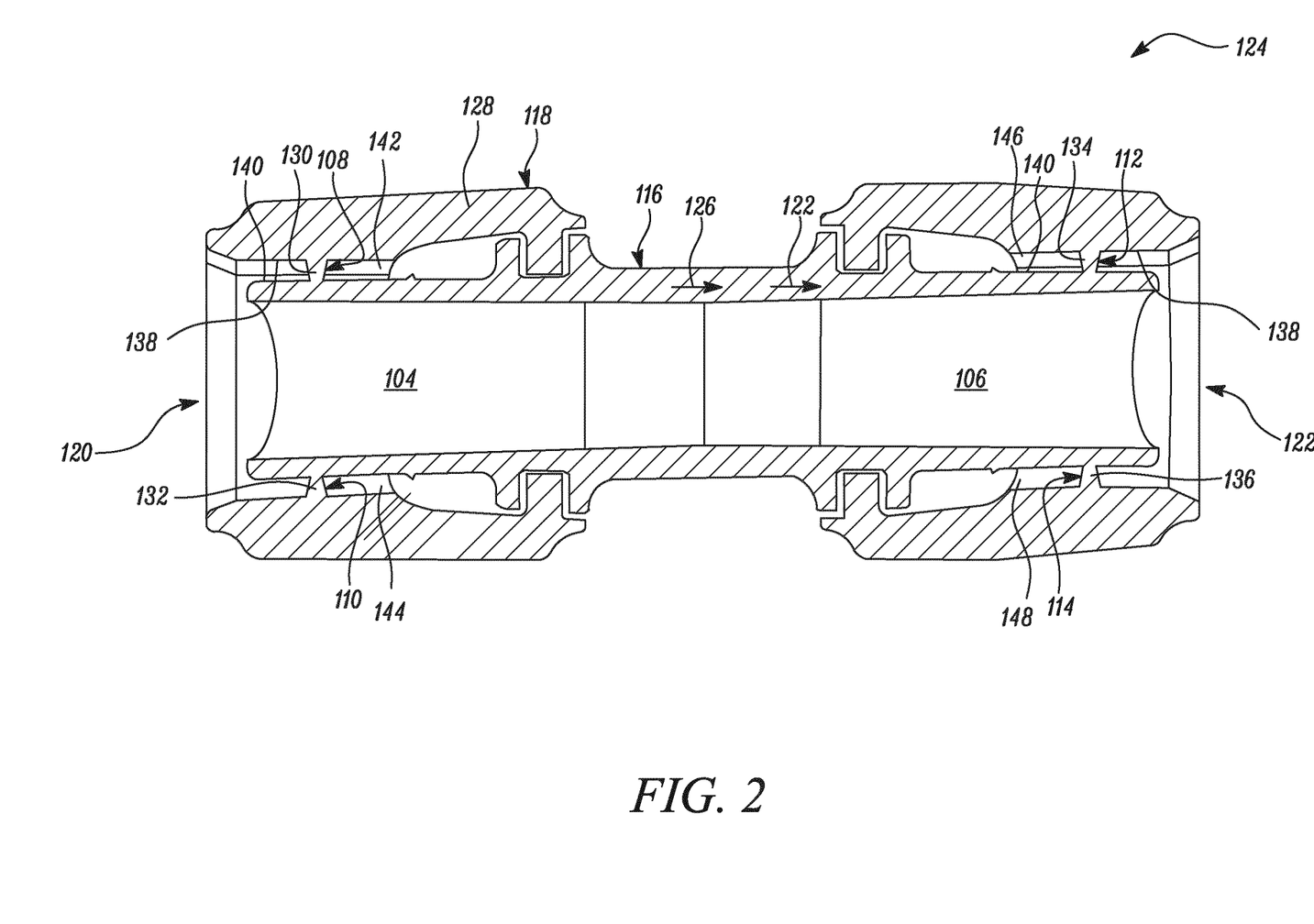
FIG. 2 shows a cross-sectional representation of a component with bonds, where the component is formed by the molding assembly, in accordance with an aspect of the present disclosure.

The molding assembly 100 includes a core to form a free-space 104, 106. During implementation of the present disclosure, the core will be placed in the free-space 104, 106 and so the present disclosure interchangeably refers to the core as "the core" for explanation and understanding purposes, as will be evident to a person having knowledge in the art. The core is adapted to be disposed within the mold 102 (shown in FIG. 1). The mold 102 further includes a core illustrated in FIG. 2 of the present disclosure with reference to free-space 104, 106. The present disclosure allows molding of a component 124, as illustrated in FIG. 2, by means of the cores which may be readily separated after the casting is complete. The component 124 of FIGS. 2, 3 of the present disclosure has been represented to illustrate position, role of the cores having two arms, respectively. Further, the arms have recesses (alternatively, openings), respectively. The recesses of the present disclosure allow simultaneous casting of multiple parts without a need to have separate castings, molds to obtain separate components as described further.

In some embodiments, the cores may be any of a type for example a cylindrical core, a balanced core, or a dovetail core. The cores may be green sand core or dry sand core. The cores may also be of a metal core. Further, the metal core may be made up of cast iron or steel. The use of sand core may allow more freedom in choice of materials such as bentonite clay, pulverized coal, resin oil or any other material as know or used in the art.

In some embodiments, the cores may be held together with the help of clamps (not shown). Additionally, or alternatively, the cores may be coupled together with the help of easily removable screws. The cores may be coupled together as one of the cores may have protruding part and another of the cores may have some grooves to hold it firmly. The cores may have high refractoriness to withstand high temperature of the molding material 117.

The cores are adapted to bifurcate the hollow portion 102 (refer FIG. 1) into a main body 116 (alternatively, hereinafter a first cavity) and a ring sleeve 118 (alternatively, hereinafter a second cavity) when placed inside the mold 102. The main body 116 and the ring sleeve 118 are referred to as the first cavity and the second cavity for explanation and understanding purposes. During actual implementation, the main body 116 and the ring sleeve 118 will be formed based on pouring and solidification of a molding material (say the molding material 117) into the first cavity and the second cavity. The molding material 117 is poured into the mold 102 of the molding assembly 100 through the inlet 115. The molding material 117 sets inside the mold 102 around the cores to form the component 124, as illustrated in FIG. 2. The present disclosure illustrates the component 124 as a connecting element 124, and both these terms are used interchangeably hereinafter. The component 124 has bonds 130, 132, 134, 136.

During the molding process the arms of the cores form free-spaces 142, 144, 146, 148 or cavities between the main body 116 and the ring sleeves 118. The free-spaces 142, 144 are connected with the free-space 104, wherein the free-spaces 146, 148 are connected with the free-space 106 due to the cores having an integral connection with their respective arms. After solidification of the molding material, the cores with their respective arms can be withdrawn from their position within the solidified component 124, such that the free-spaces 104, 106 and 142, 144, 146, 148 remain in the component 124. It shall be noted that the arms of the cores as well as all other parts of the cores may be provided in a form that allows withdrawing from their position within the solidified component 124.

For forming the bonds 130, 132, 134, 136 between the main body 116 and the ring sleeves 118, recesses are provided in the arms of the cores. During casting, molding material 117 sets inside the mold 102 around the arms which are part of the cores and also flows and sets inside the recesses of the arms, thereby forming the bonds 130, 132, 134, 136.

The connecting element 124 includes the main body 116 having a first side 120 and a second side 122. The second side 122 is opposite to the first side 120. The connecting element 124 includes at least one ring sleeve 118. The present disclosure illustrates two ring sleeve 118, however actual implantation may have any number, type, size, position thereof. The at least one ring sleeve 118 and the main body 116 are rotatable relative to each other.

As illustrated in FIG. 2, the molding material 117 fills up the first cavity. Herein, the first cavity corresponds to a body of the component 124. Moreover, the material 122 in the first cavity is referred as a first cavity material 126. The molding material 117 when passes through the recesses 108, 110, 112, 114 reaches the second cavity. Further, the second cavity corresponds to a sleeve of the component 124. Moreover, the material 122 in the second cavity is referred to as a second cavity material 128. The molding material 117 forms the bonds 130, 132, 134, 136 between the first cavity and the second cavity of the component 124.

In some embodiments, the molding material 117 may be in form of metal, plastic, glass, polymer, and the like. The molding material 117 may be of any choice of metal such as aluminium, magnesium, copper alloys, tin, zinc, lead alloys, iron, steel, or any other material as used or known in the art.

Figure 3:
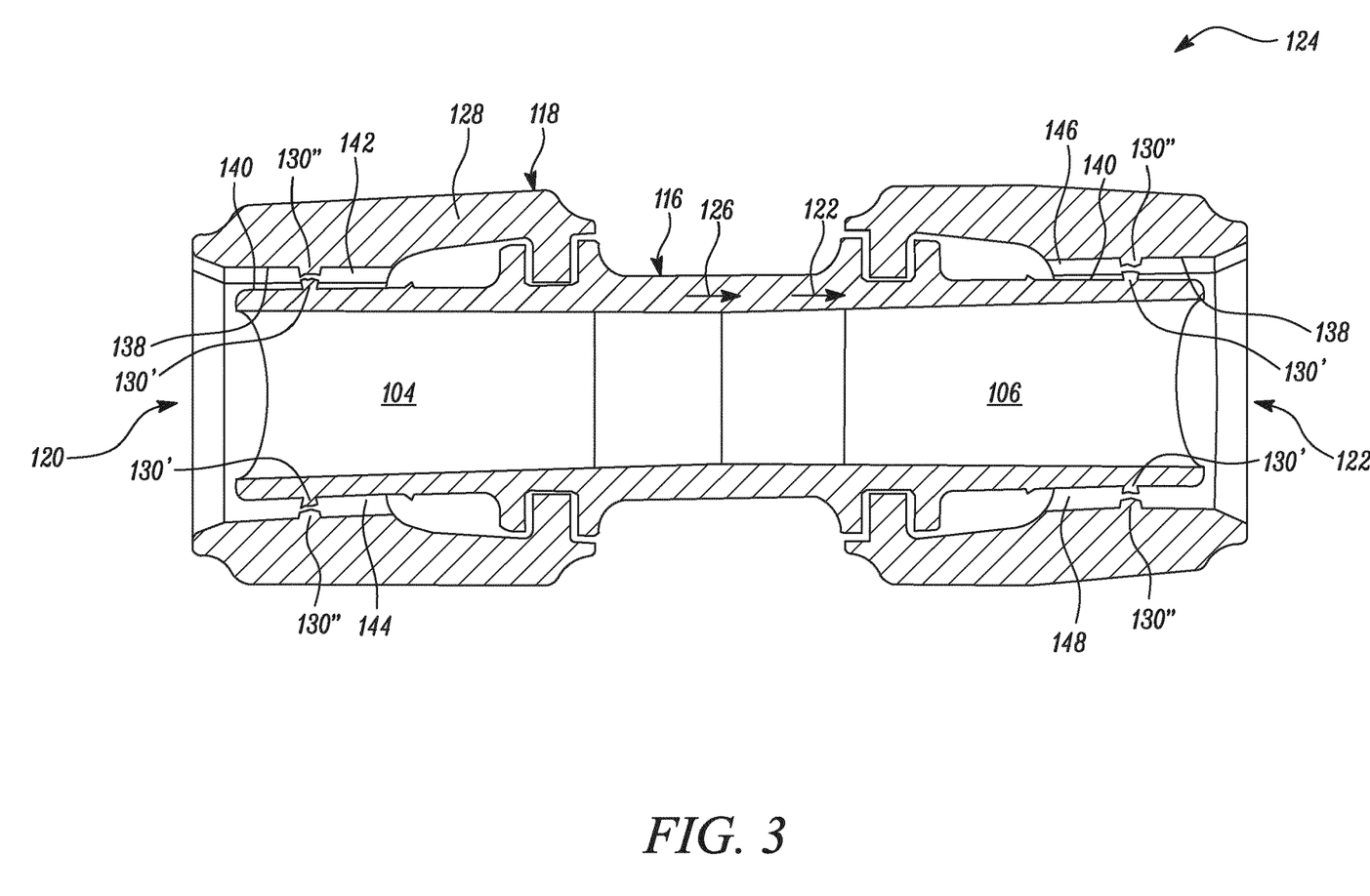
FIG. 3 shows a cross-sectional representation of the component after breaking of the bonds or forming places of fracture, in accordance with an aspect of the present disclosure.

FIG. 3 illustrates the component 124 after the bonds 130, 132, 134, 136 have been broken between the first cavity and the second cavity. When the cores (referred interchangeably with the free-space 104, 106) are removed after the molding material has been set around the cores causing the breaking of bonds. On withdrawing the core out of the mold 102, the bonds 130, 132 may break. Likewise, on withdrawing the core 106 outside the mold 102, the bonds 134, 136 may break. Put simply, any known technique, sequence, components may be applied to break the bonds 130, 132, 134, 136 such that there is minimum, or no distortion or breakage associated with the final versions of the first cavity and the second cavity. The complete component 124 is formed with separate parts, where the main body 116 (of the first cavity) and the at least one ring sleeve 118 (of the second cavity) are isolated (spatially) from each other as illustrated.

In some embodiments, the connecting element 124 is such that the main body 116 and the at least one ring sleeve 118 are manufactured together integrally molded as one part during the manufacturing process forming the bond 130, 132, 134, 136. Places of fracture 130', 130" (say flush) on each of the first side 120 and the second side 122 of the main body 116 is generated from the at least one ring sleeve 118 placed thereon by breaking of the bond 130, 132, 134, 136. In some embodiments, the places of fracture 130', 130" which is produced may suffer minor change in shape, dimensions, and the like during breaking of the bonds 130, 132, 134, 136.

As illustrated in FIG. 3, the present disclosure provides the component 124, in particular the connecting element. The component 124 includes the main body 116 and the at least one ring sleeve 118. The at least one ring sleeve 118 and the main body 116 are rotatable relative to each other. The main body 116 and the at least one ring sleeve 118 are manufactured together integrally molded as one part during the manufacturing process forming the bond 130, 132, 134, 136. The component 124 is characterized in that the main body 116 and the at least one ring sleeve 118 enclose places of fracture 130', 130" resulting from breaking of the bond 130, 132, 134, 136 therebetween. This enclosing of the places of fracture 130', 130" resulting from breaking of the bond 130, 132, 134, 136 leads to a simple, aesthetic, and efficient application of the component 124. Further, the aesthetic, and efficient application of the component 124. Further, the places of fracture 130', 130" remain shielded within the at least one ring sleeve 118 leading to a trouble-free, clean and user-friendly application of the component 124.

In some embodiments, the places of fracture 130', 130" result from breaking of the bonds 108, 110, 112, 114 by removing the at least one core from at least part of the hollow portion H within the mold 102. This ensures that the places of fracture 130', 130" from breaking of the bonds 108, 110, 112, 114 result easily on removing of the at least one core leading to efficient, simple manufacturing of the component 124.

In some embodiments, the molding material 117 may be same or different for both the first cavity and the second cavity. Further, to provide different molding materials for both the first cavity and the second cavity, different inlets may be provided.

In some embodiments, the molding material 117 present in the recess 108, 110, 112, 114 may of same nature as that of present in the first cavity and the second cavity. Alternatively, the molding material 117 may be of different nature, when recess 108, 110, 112, 114 are provided with some other inlet. As will be evident, there may be a upside to have different nature of the molding material 117 for the recess 108, 110, 112, 114 such that the recess 108, 110, 112, 114 may more readily break away during taking away of the cores.

In some embodiments, the present disclosure may be implemented with only a single core (not shown) within the first cavity. The single core may have required number of arms with the recess. Further, the present disclosure may be implemented with two or more cores, according to the need of casting different component parts, and all such variations are well within the scope of the present disclosure.

In some embodiments, the component 124 may be a garden connector facilitated with a body i.e. the main body 116 and a sleeve i.e. the ring sleeve 118 or a vessel with lid, and the like. The component 124 may have multiple pieces.

In some embodiments, the cores may be removed manually. Some basic tools such as tongs, forging tools, tweezers, and the like may be required to remove the core from the mold 102. The cores may have high collapsibility such that they may be disintegrated quickly after the solidification of the molding material 117 is complete. In some embodiments, the removal of the cores, and/or of the first cavity and the second cavity with the recesses 108, 110, 112, and 114 provides with a possibility to get the component 124 with number of disconnected parts (say the first cavity and the second cavity). The cores with the recesses 108, 110, 112, 114 leads to better time and output efficiency as different parts of the component 124 are formed together, without a need to cast separately.

In some embodiments, the recesses 108, 110, 112, 114 may be formed during manufacturing with application of the cores (illustrated with the free-space 104, 106). Some solids may be inserted during the manufacturing of the cores to get desired recesses 108, 110, 112, 114.

In some embodiments, the cores, and/or the first cavity and the second cavity may produce hollow sections in molding in form of internal cavities. The cores and/or the first cavity and the second cavity may be sufficiently permeable to allow the easy escape of gases during pouring and solidification. The cores may be deployed to improve features (say finish, texture, quality, and the like) of any surface of the component 124. The cores may provide external under-cut features in molding. The cores may be inserted to achieve deep recesses in the molding.

Figure 4:
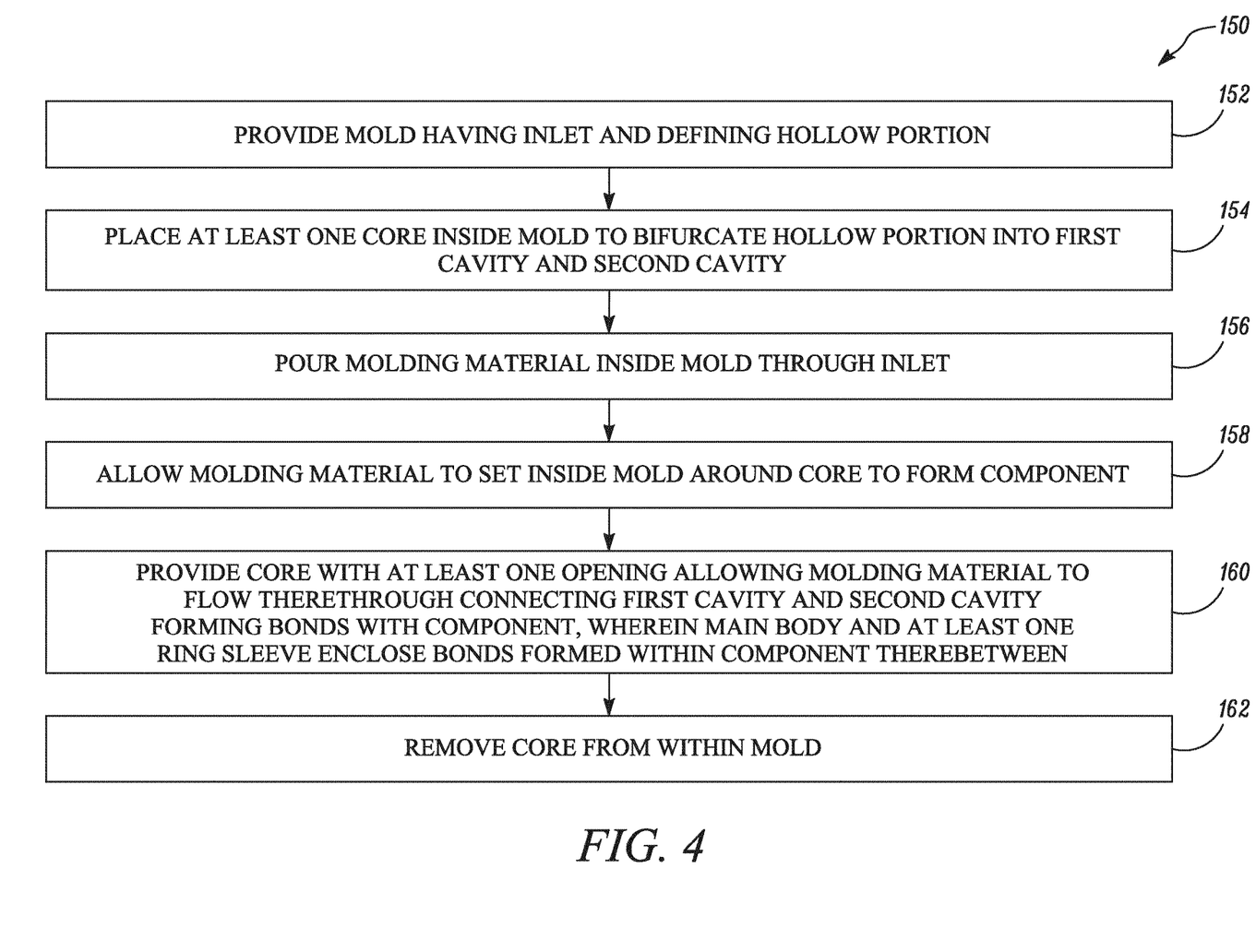
FIG. 4 shows a flowchart for a method of manufacturing a component through a molding assembly, in accordance with an aspect of the present disclosure.

As illustrated in FIG. 4, the present disclosure may be implemented by the method 150 of manufacturing the component 124 through the molding assembly 100. At step 152, the method 150 includes providing the mold 102 having the inlet 115 and defining the hollow portion H. And at step 154, the method includes placing the at least one core to form free spaces within the component 124 inside the mold 102 to bifurcate the hollow portion "H" into the first cavity and the second cavity. At step 156, the method 150 further includes pouring the molding material 117 inside the mold 102 through the inlet 115. At step 158, the method 150 then includes allowing the molding material 117 to set inside the mold 102 around the core within the first cavity and the second cavity to form a main body 116 and at least one ring sleeve 118 within the component 124. The method is characterized in that, at step 160, the method includes providing the core with at least one recess allowing the molding material 117 to flow therethrough connecting the first cavity and the second cavity forming bonds 108, 110, 112, 114 with the component 124. The main body 116 and the at least one ring sleeve 118 enclose the bonds 108, 110, 112, 114 formed with the component 124 therebetween. The method further includes, at step 162, removing the at least one core from at least part of the hollow portion H within the mold 102. This removal of the core is such that the bonds 130, 132, 134, 136 get broken, at least partially for first-use of the component 124. The present disclosure allows to provide a breakage-free and trouble-less experience to users since the bonds 130, 132, 134, 136 may be easily removed or provide places of fracture 130', 130" after manufacturing. This way the product i.e., the component 124 may be provided for the users without any need to undesirably "break" the component 124 before the first-use. Thus, the present disclosure allows to avoid any unwanted and unexpected breakage during the first-use of the product by the users.

In some embodiments, the method includes forming the bonds 108, 110, 112, 114 with the component 124 between an outer surface 140 of the main body 116 and an inner surface 138 of the at least one ring sleeve 118. This provides improved aesthetic and functionality to the component 124, even after breaking of the bonds 108, 110, 112, 114 post first-use of the component 124.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Molding Assembly
102 Mold
103 Moving Slide
104 Free-space
105 Ejector System
106 Free-space
107 Stationary Side
108 Recess
109 Core Side
110 Recess
111 Cavity Side
112 Recess
113 Spruce and Runner System
114 Recess
115 Inlet
116 Main Body
117 Molding material
118 Ring Sleeve
120 First Side
122 Second Side
124 Component/Connecting Element
126 First cavity material
128 Second cavity material
130 Bond
130' Places of fracture
130" Places of fracture
132 Bond
134 Bond
136 Bond
138 Inner Surface
140 Outer Surface
142 Arm
144 Arm
146 Arm
148 Arm
150 Method
152 Step
154 Step
156 Step
158 Step
160 Step
162 Step
H Hollow Portion

The invention claimed is:

1. A method of manufacturing a component having a main body and at least one ring sleeve through a molding assembly, the method comprising:
providing a mold having an inlet and defining a hollow portion;
placing at least one core to form a free-space within the component inside the mold to bifurcate the hollow portion into a first cavity and a second cavity;
pouring a molding material inside the mold through the inlet;
allowing the molding material to set inside the mold around the core within the first cavity and the second cavity to form a main body and at least one ring sleeve of the component;
connecting the first cavity and the second cavity and forming at least one first bond and one second bond between the main body and the at least one ring sleeve;
removing the at least one core from at least part of the hollow portion within the mold; and
providing the core with at least one recess allowing the molding material to flow therethrough such that on withdrawing the core out of the mold, at least one first bond breaks and on withdrawing the core outside the mold, at least one second bond breaks.

2. The method of claim 1, wherein forming the at least one first bond and one second bond includes forming of the main body and the at least one ring sleeve such that the at least one first bond and one second bond are fully enclosed between the main body and the at least one ring sleeve.

3. The method of claim 1, wherein the placing at least one core to form the free-space within the component inside the mold comprises placing a first core to form at least one first free-space and a second core to form at least one second free-space within the component inside the mold, wherein upon withdrawing the first core out of the mold at least one first bond breaks and wherein upon withdrawing the second core out of the mold at least one second bond breaks.

4. The method of claim 3, wherein the first core is withdrawn in a direction substantially different to a direction in which the second core is withdrawn.

5. The method of claim 1, wherein the at least one core comprises at least one core main body and at least one arm attached to the at least one core main body, thus, allowing the molding material to set inside the mold around the core main body within the first cavity and/or the second cavity to form the main body and allowing the molding material to set inside the mold around the at least one arm within a free-space to form the ring sleeve.

6. The method of claim 1, wherein the at least one core comprises at least one core main body and at least one, arm separate from core main body and movable relative to the core main body, thus, allowing the molding material to set inside the mold around the core main body within the first cavity and/or the second cavity to form the main body and allowing the molding material to set inside the mold around the at least one arm within a free-space to form the ring sleeve.

7. The method of claim 5, wherein withdrawing the core out of the mold comprises withdrawing the at least one core main body and the at least one arm simultaneously in a movement relative to the mold such that the at least one first bond and the at least second bond break, or wherein withdrawing the core out of the mold comprises withdrawing the at least one arm at least partially out of the mold before or after withdrawing the core main body out of the mold in a movement of the at least one arm relative to the core main body such that the at least one first bond and the at least second bond break, or wherein withdrawing the core out of the mold comprises rotating the at least one arm relative to the mold such that the at least one first bond and the at least second bond break.

8. The method of claim 5, wherein the at least one arm comprises at least one recess, allowing the molding material to set inside the at least one recess to form the at least one first bond and one second bond, and/or wherein the at least one arm is provided as a sleeve element comprising recesses in the form of openings.

9. The method of claim 1, wherein the component is a connecting element.

10. The method of claim 1, wherein the method includes forming the at least one first bond and one second bond with the component between an outer surface of the main body and an inner surface of the at least one ring sleeve.

* * * * *